US012455051B1

(12) United States Patent
Wise

(10) Patent No.: US 12,455,051 B1
(45) Date of Patent: Oct. 28, 2025

(54) WRIST ILLUMINATION DEVICE

(71) Applicant: Pamela Wise, Topanga, CA (US)

(72) Inventor: Pamela Wise, Topanga, CA (US)

( * ) Notice: Subject to any disclaimer, the term of this patent is extended or adjusted under 35 U.S.C. 154(b) by 0 days.

(21) Appl. No.: 18/650,925

(22) Filed: Apr. 30, 2024

Related U.S. Application Data

(60) Provisional application No. 63/523,580, filed on Jun. 27, 2023.

(51) Int. Cl.

| | |
|---|---|
| ***F21S 4/24*** | (2016.01) |
| ***F21S 9/02*** | (2006.01) |
| ***F21V 21/08*** | (2006.01) |
| ***F21V 23/00*** | (2015.01) |
| ***F21V 23/04*** | (2006.01) |
| ***F21Y 113/13*** | (2016.01) |
| ***F21Y 115/10*** | (2016.01) |

(52) U.S. Cl.
CPC . *F21S 4/24* (2016.01); *F21S 9/02* (2013.01); *F21V 21/0816* (2013.01); *F21V 23/001* (2013.01); *F21V 23/04* (2013.01); *F21Y 2113/13* (2016.08); *F21Y 2115/10* (2016.08)

(58) Field of Classification Search
CPC ........... F21S 9/02; F21S 4/24; F21V 21/0816; F21V 23/001; F21V 23/04; F21V 33/0008; F21Y 2113/13; F21Y 2115/10
See application file for complete search history.

(56) References Cited

U.S. PATENT DOCUMENTS

| | | | | |
|---|---|---|---|---|
| 10,191,574 | B2 * | 1/2019 | Shin | H04M 1/05 |
| 10,935,221 | B1 * | 3/2021 | Tirosh | F21V 23/0464 |
| 2006/0076376 | A1 * | 4/2006 | Kemery | G08B 5/38 224/267 |
| 2006/0198120 | A1 * | 9/2006 | Guzman | A44C 15/0015 362/103 |
| 2013/0188335 | A1 * | 7/2013 | Marche | G09F 21/02 362/103 |
| 2014/0254142 | A1 * | 9/2014 | Ward | G09F 21/026 359/296 |
| 2016/0290624 | A1 * | 10/2016 | Dai | G02B 6/0011 |
| 2017/0160819 | A1 * | 6/2017 | Yi | G06F 3/03 |

FOREIGN PATENT DOCUMENTS

CA 2978545 A1 * 3/2019

* cited by examiner

*Primary Examiner* — Erin Kryukova
(74) *Attorney, Agent, or Firm* — Richard D. Allison

(57) ABSTRACT

A wrist light is provided that includes a top element, body element, lighting assembly and a bistable spring. The Bistable spring is movable between flat and coiled configurations to provide a wrist light that may be coiled along the wrist of the user to provide illumination outwardly from the wrist light and to provide a light at the end of the wrist light for directional lighting. The wrist light is formed of a soft and flexible material with the lighting projecting from the outer surface of the wrist light in the coiled configuration.

16 Claims, 6 Drawing Sheets

WRIST ILLUMINATION DEVICE

CROSS REFERENCE TO RELATED APPLICATION

This application claims the benefit of U.S. Provisional Application No. 63/523,580 filed on Jun. 27, 2023, entitled "Wrist Light."

BACKGROUND OF THE INVENTION

Field of the Invention

The present invention relates to a light for use on a wrist. More specifically, the present invention relates to an illuminating device that may be removably affixed to a user's wrist, allowing the performance of tasks with a hands-free light source or as a decorative light.

Lighting equipment may be required for the performance of certain tasks. Mechanics, for example, may need flashlights or drop lights to view the intricate systems within a vehicle cavity that would otherwise be difficult or impossible to see. However, extra lighting aids can be cumbersome and difficult to use while trying to work. Additionally, individuals who run or walk outside for exercise may like to bring water, musical devices or similar handheld articles with them on their excursions, requiring the use of both hands. If they are outside when night falls, however, they must have lights handy to ensure that they can be seen and be avoided by motorists, as well as visualize the path in front of them as they walk or run. Carrying a flashlight and other devices may take up one or more hands, requiring users to choose between carrying lights and other devices they may require. Similarly, those that walk their dogs at night would benefit from having both hands free to carry a leash and another handheld device.

The present invention addresses the need to free a user's hands while performing activities in low light situations by providing a wrist affixing, hands-free lighting solution. Additionally, the present invention provides an attractive lighted wrist band for use by children to allow them to be seen at dusk or night.

DESCRIPTION OF THE PRIOR ART

Patents and patent applications have previously issued that disclose hands-free lighting devices that address similar issues. These prior art devices have several known drawbacks and fail to fulfill the needs addressed by the present invention.

Several patents have issued for devices directed to wrist illumination devices, each having a significant draw-back. Barbour U.S. Pat. No. 4,521,832 is directed to an illuminating device designed to distribute light in a working area without requiring the user to employ a flashlight. Primarily, the Barbour invention consists of a wrist strap of foam plastic, having a self-contained and replaceable battery, held in place by hook and loop fasteners. It further includes a plurality of spaced bulbs to provide light for the user to work by while leaving the user's hands free of objects. Additionally, Barbour filed U.S. Design Pat. No. D596,325 is directed to an ornamental design for a wrist light. The Barbour inventions define a wrist light with only a limited number of lights; specifically, only four lights are claimed. In many situations, such limited illumination will not be sufficient or may be blocked by the wrist of the user.

U.S. Patent Application No. 2011/0310592 filed by Smith addresses the need for further directed lighting by providing lighting around the entire circumference of the wrist, in addition to offering an improved and less cumbersome design.

Several issued patents describe inventions with only a single light source. Fuller U.S. Pat. No. 4,788,631 is directed to a wrist-mounted flashlight having a sliding lens. The lens has a white light section and a red light section. The case of the flashlight contains batteries and electrical contacts. The bulb is mounted at an inclination relative to the wrist-contacting surface of the case. The bulb extends into a space between the batteries.

Similarly, Jewell U.S. Pat. No. 5,568,971 is directed to a wrist mounted light source including a generally cylindrical central housing. The device has an upper surface having an opening centrally located therein and a lower surface having an opening therein. A surrounding sidewall has a first opening and a second opening therein. A battery is secured within the central housing as well as an upper light. The upper light electrically couples to the battery. A side light is secured within the central housing inwardly of the first opening in the surrounding sidewall thereof and is electrically coupled with the battery. A power switch is secured within the second opening of the surrounding sidewall of the central housing. The power is electrically coupled to the battery, the top light and the side light.

Additionally, Yu U.S. Pat. No. 6,213,619 is directed to a flashlight assembly that is mountable onto a user's wrist to provide a light source which is pivotable in two planes of motion. The assembly includes a housing that is pivotably mounted on a wristband. The housing includes a light source that is pivotably mounted thereto.

The Fuller, Jewell and Yu inventions consist essentially of a single light source attached to the wrist, and as such will provide only limited illumination. Additionally, if the wrist flexes in a certain manner, the wrist blocks the light entirely. The present invention addresses this by mounting lights around the entire circumference of the wrist to provide sufficient illumination in all instances.

Other inventions are directed to remedying issues only tangentially related to those addressed by the present invention. Ask U.S. Pat. No. 4,812,953 is directed to a safety light band that maximizes the visibility of a pedestrian wearing the band in poorly lit or unlighted conditions. The band is formed as a flexible strap having fastening means for wearing the band on the person, and luminous means comprising an interactive combination of electric lamps and reflective surfaces. The Ask invention is designed to address the issue of personal visibility at night. While the present invention may be used in a manner that provides additional visibility, the primary issue addressed is providing illumination for work being performed.

Similarly, Rhine U.S. Pat. No. 4,910,652 is directed to an analog watch for training children to read the current time having a flashlight installed in the watchcase. The flash-light power supply is connected to the light emitting flashlight bulb through an electrical circuit that automatically turns the flashlight off after a time delay to preserve battery power. The watch time indicating face has numbers and dots to represent hours, and numbers and dots that represent minutes. The Rhine invention is directed away from the issues of the present invention, and specifically addresses the issue of teaching children to read a wristwatch.

Finally, other publications are directed to illumination only in a decorative sense. Lynch U.S. Pat. No. 6,578,982 is directed to a strap-like item of wearing apparel having studs capable of illumination. A light-emitting diode (LED) is disposed within each stud. The LED's are activated by means of a circuit. The Lynch invention, while serving as a trendy accessory, does not address the issue of providing illumination sufficient to allow the user to perform manual tasks with their hands. The present invention is designed to address this need.

Another type of wrist band is disclosed in U.S. Pat. No. 9,944,111 granted to Elmore. The Elmore patent is directed to a non-lighted writing instrument that allows for the automatic retraction and extension of the writing element of a bendable self-retaining writing instrument. The method and apparatus consist of a writing element that is joined to the end of a flexible tube or material. These are inserted through a longitudinal channel formed along the outer surface of the writing instrument and are anchored only at the end opposite the writing element When the bendable self-retaining writing instrument transitions from a coiled to straight configuration the writing element is automatically exposed. Conversely, when pushed into its coiled configuration the writing element slides back into the channel and is thereby protected. The flexible tube or material may also act as a reservoir for a writing substrate such as ink.

While some patents and patent applications have been filed regarding wrist lighting devices, there is no device in the prior art that suitably addresses the need for a lightweight, directed, and wrist-worn light that is readily attachable to the wrist of the user. Prior art inventions offer single or limited lighting and do not provide light around the total circumference of the practitioner's wrist. The present invention addresses a need in the art, and subsequently it is clear that it provides a new structure that fulfills these needs.

SUMMARY OF THE INVENTION

In view of the foregoing disadvantages inherent in the known types of wrist mounted lights now present in the prior art, the present invention provides a new wrist light wherein the same can be utilized for providing convenience for the user when performing manual tasks with their hands that requires illumination.

One embodiment of the present invention provides illumination around the circumference of a practitioner's wrist and is useful for children, dog walkers and runners. Another embodiment of the present invention provides directed illumination of a work area or forward path. The device provides light for those who work or participate in recreational activities in dark areas or poorly lit areas. The device eliminates the need to carry cumbersome pieces of handheld lighting equipment or head-strap flash-lights for safe and effective lighting. Mechanics, divers, runners, and other practitioners who frequently take walks will find this invention to be very beneficial in dimly lit areas.

It is therefore the principal object of this invention is to provide a wrist strap-illuminating device, which is easily attachable to the wrist of the user without relying on various clips, buckles or connectors. Additionally, the wrist band of this invention accommodates wrists of all sizes and does not need to be adjusted for use on a child or adult.

Another object of this invention is to provide a wrist strap-illuminating device, which will be of such design as to employ a plurality of small light bulbs or LEDs therein, Further, the device will include a self-contained switch and battery means for its operation.

Yet Another object of this invention is to provide a wrist strap illuminating device, which employs a variety of colors or designs that are attractive for children so that the children enjoy wearing the illuminating device while providing lighting to allow the child to be observed.

Other objects, features and advantages of the present invention will become apparent from the following detailed description taken in conjunction with the accompanying drawings.

BRIEF DESCRIPTIONS OF THE DRAWINGS

DETAILED DESCRIPTION

Figure 1:
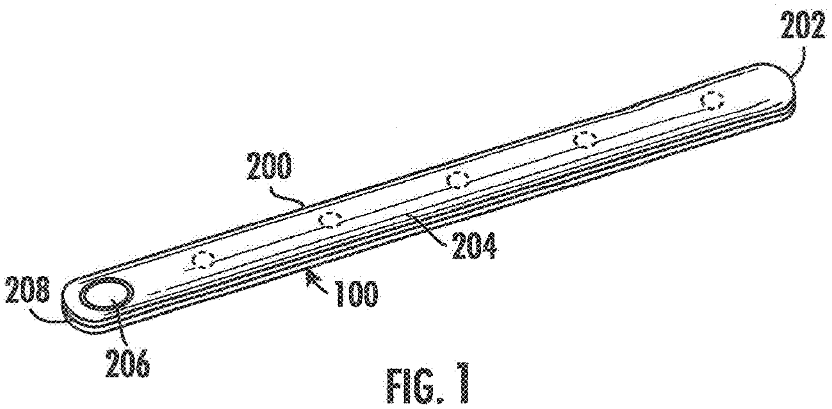
FIG. 1 is a perspective view of the wrist light of the present invention.

Although the characteristic features of this invention will be particularly pointed out in the claims, the invention itself, and way it may be made and used, may be better understood by referring to the following description taken in connection with the accompanying drawings.

The wrist light 100 of the present invention generally consists of a top element 200; a lighting element 300; flexible body 400 and a spring element 500. The top element 200 is preferably formed of a flexible and transparent or semi-transparent material. The lighting element 300 is formed of a bendable and semi-rigid material such as a wire. The lighting element 300 preferably includes 1 or more LEDs 304 which extend along the generally rod or wire shaped element 302. At one end of the rod shaped element 302, a switch element 306 and battery or power source 308 are located at one end of the lighting element 300. An elongated and flexible body element 400 receives the lighting element therein and engages the top element 200. A spring element 500 is attached to the body element 400.

Figure 8:
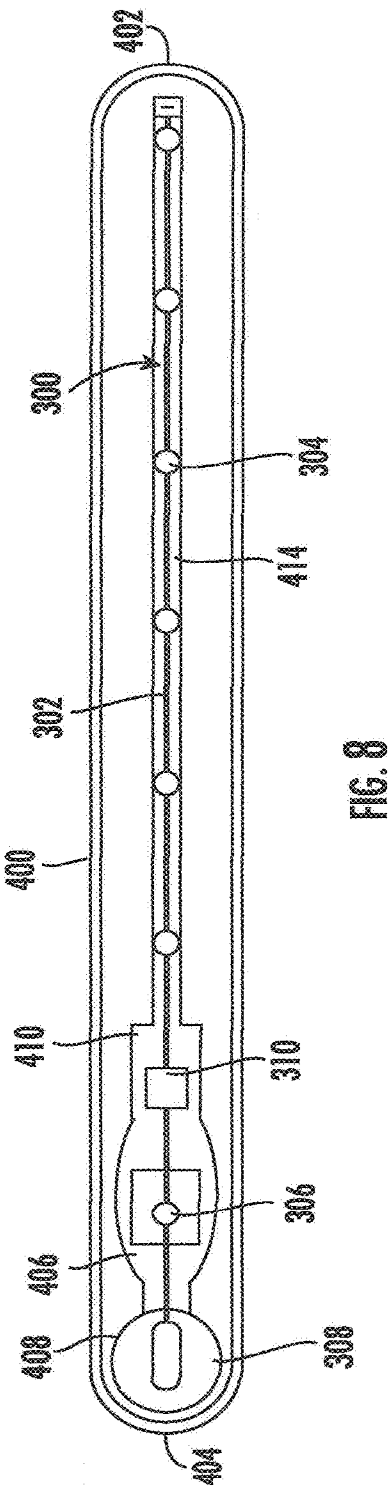
FIG. 8 is a top perspective view of the present invention with the top element removed.

The top element 200 is preferably shaped as an elongate and flexible member having a curved surface at the first end 202 and rectangular surface 204 and circular shaped surface 206 along the second end 208. The top element 200 is preferably formed of any suitable material that is both sufficiently strong but also adequately flexible, typically silicone, vinyl, or fabric. Additionally, the top element 200 may be fully transparent, semi-transparent or selectively transparent. As shown in FIGS. 1 and 8, the first end 202 of the top element 200 encloses the lighting element 300 and is either fully transparent or semi-transparent at least along the locations of the LEDs 302 of the lighting element 300. The first end 202 of the top element 200 preferably forms a tapered or curved surface in combination with the body element 400. The second end 208 of the top member 200 includes both the rectangular section 204 and circular shaped section 206. The rectangular section 204 is positioned over the switch element 306 to provide a flexible protective surface to allow the user to activate the switch element 306 by pressing on the rectangular section 204 of the top element 200. The circular section of the at the second end 208 is positioned over the battery or power source 308 to protect the power source 308 from exposure to the elements while still providing an access point for the replacement of the power source 308, if necessary.

Figure 7:
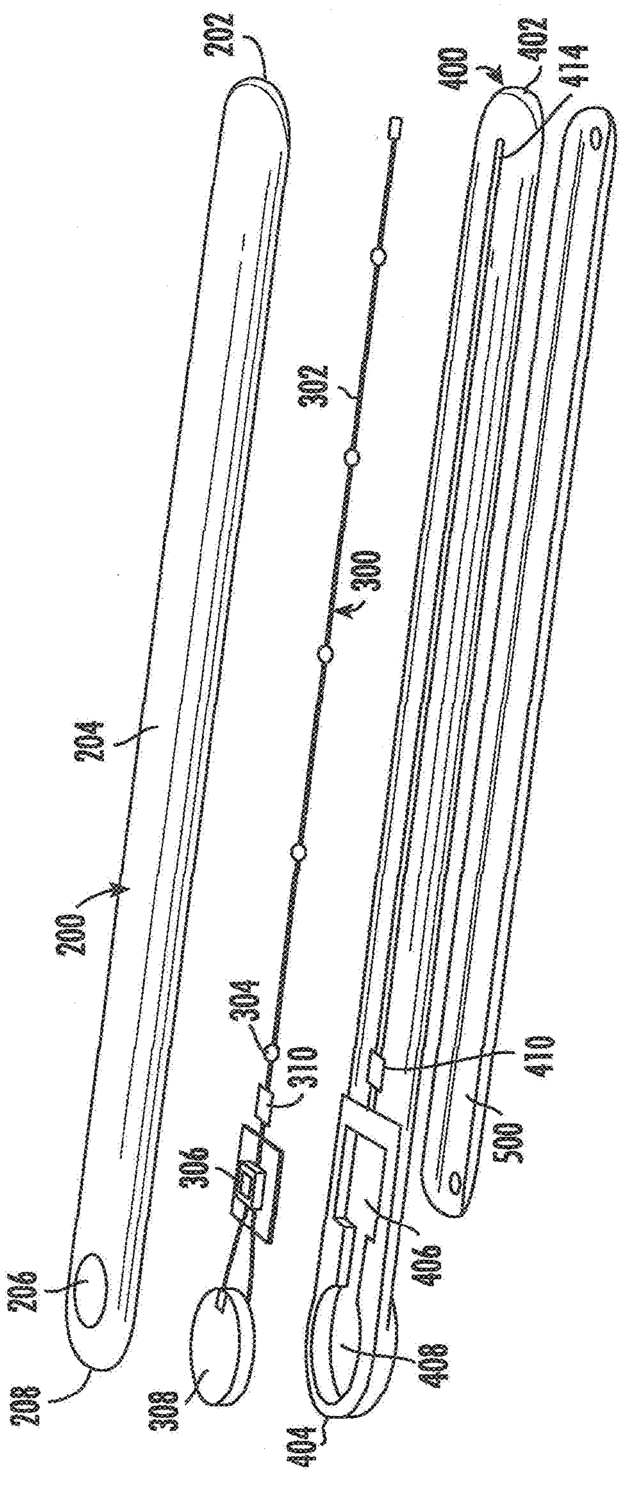
FIG. 7 is an exploded perspective view of the present invention.

As shown in FIGS. 7 and 8, the lighting element 300 includes an elongate and generally rod shaped element 302 which is formed of a wire or similar material. In the first embodiment, the rod shaped element 302 is flexible and preferably includes at least three LEDs 304 that are spaced apart along the length thereof. Each of these LEDs 304 provides an outwardly directed light source. In this embodiment, the wrist light 100 is generally sized for use on a child's wrist and therefore, fewer LED lights are used. In an embodiment directed for use by adults, more lights may be spaced apart along the rod shaped element 302. The lighting element also includes a switch element 306 that may be formed from many available elements such as a depressible on/off switch. As shown, the battery or power source 308 is also aligned along the lighting element 300 and may be a standard battery such as a watch battery.

The body element 400 is an elongate and generally rectangular element and is sized to fixedly receive the top member 208 thereon or therein to form a smooth surface between the two elements. The body element 400 is preferably formed of a flexible and durable material that includes a plurality of recesses thereon and is formed of material that is either the same or similar to the material of the top element 200. The top surface of the body element 400 includes the first end 402 which is positioned adjacent to the first end 202 of the top element 200 when the wrist light 100 is assembled. The rod shaped element 302 of the lighting element 300 is sandwiched between the top element 200 and body element 400. As described below, the rod shaped element 302 is movable relative to the top element 200 and body element 400. The body element also includes a second end 404 having a first recessed area 406 and a second recessed area 408. The first recessed area 406 is sized to receive the switch element 306 therein in a relatively fixed position. The second recessed area 408 is sized to receive the power source or battery 308 therein. The body element may also include a third recessed area 410 that is sized to receive a control element to allow the user to select the lighting pattern or colors for the LEDs 304. The bottom surface of the body element 400 preferably includes the spring element 500 attached thereto. The spring element 500 may be affixed to the bottom surface of the body element 500 or may be received in a recess thereon. Finally, a recessed slot 414 which extends along the lengthwise dimension of the body element 400 to movably receive rod element 302 and LEDs 304 of the lighting element 300 therein.

The spring element 500 is preferably a bi-stable type of spring such that the spring is stable in an elongate configuration as well as the coiled configuration. The spring element 500 is typically made of, but not limited to, a metal or plastic that is fashioned in such a way as to be stable in both the coiled and straight configurations. When the spring element 500 is stressed sufficiently while in its straight configuration, it changes shapes into a circular coil. The elements of the wrist light 100 may be assembled using various adhesives or may be snap fit to provide the device shown in the Figures and operatively described below.

Figure 2:
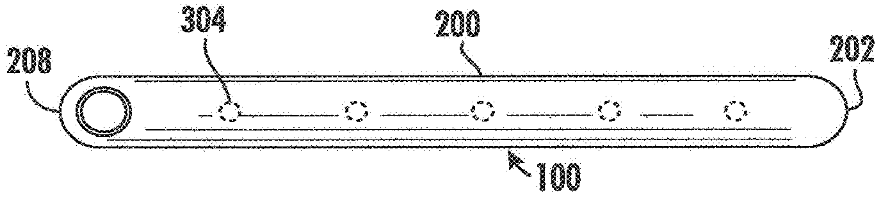
FIG. 2 is a top view of the present invention.
Figure 3:
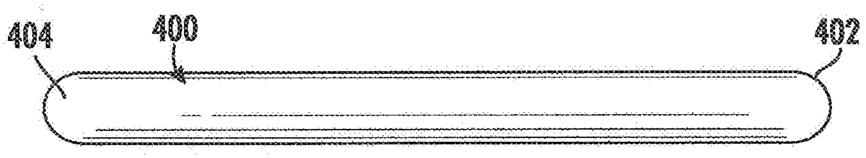
FIG. 3 is a bottom view of the present invention.
Figure 4:
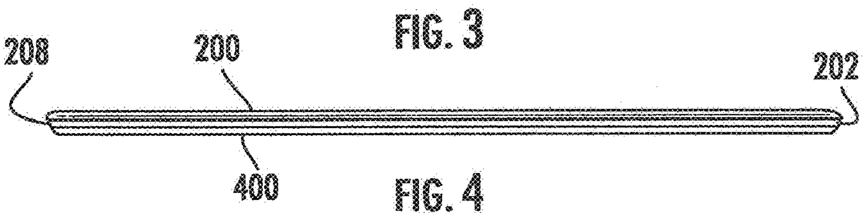
FIG. 4 is a side view of the present invention.
Figure 5:
FIG. 5 is a first end view of the present invention.
Figure 6:
FIG. 6 is a second end view of the present invention.
Figure 11:
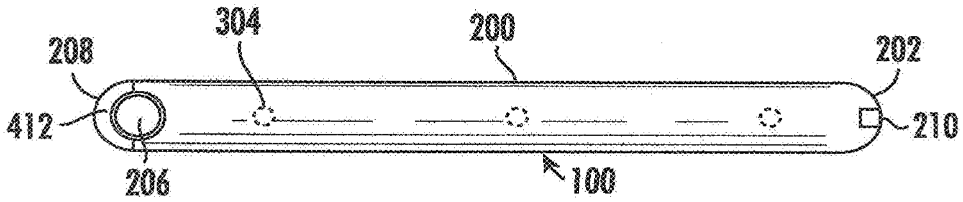
FIG. 11 is a top view of an alternate form of the wrist light.
Figure 12:
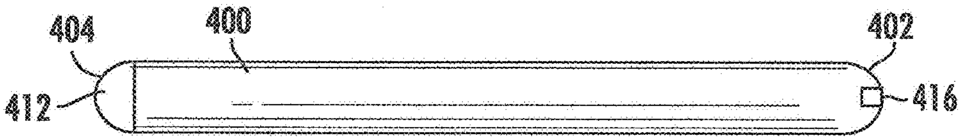
FIG. 12 is a bottom view of an alternate form of the wrist light.
Figure 13:
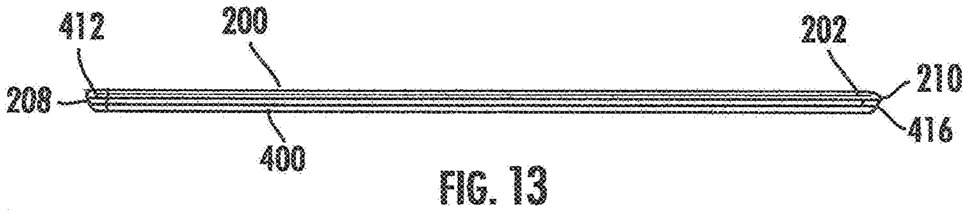
FIG. 13 is a side view of an alternate form of the wrist light.
Figure 14:
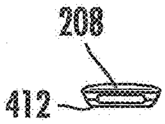
FIG. 14 is a first end view of an alternate form of the wrist light.
Figure 15:
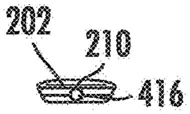
FIG. 15 is a second end view of an alternate form of the wrist light.
Figure 16:
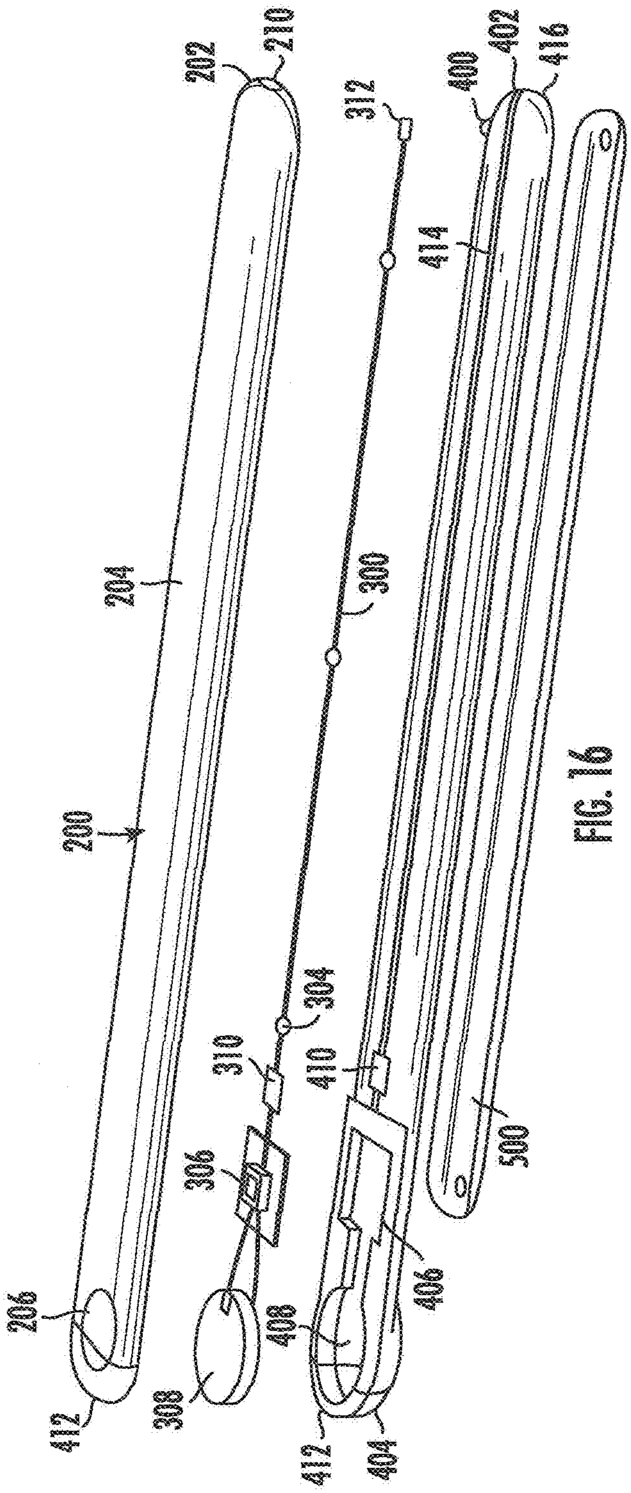
FIG. 16 is an exploded perspective view of an alternate form of the wrist light.

The assembled wrist light 100 may include a straight configuration shown in FIGS. 1 and 2. In this straight configuration, the user may actuate the LEDs 304 by depressing the switch element 306 when an on/off type of switch is used. As shown in FIG. 11, the user may also activate the switch element 306 to illuminate an LED 304 shown on the first end 402 of the body element 400. The use of the LED 304 in this orientation allows the user to use the wrist light 100 for directional lighting. Additionally, this embodiment may also allow the user to use the directional lighting when the wrist light 100 is coiled around the user's wrist by providing a LED 304 light that projects from the first end 402 of the body element 400 and the arm of the user. The LEDs 304 may be single color or multicolor and may be activated by a simple on/off switch element 306 or a modified switch element 306 that allows the user to select colors and/or lighting patterns.

Figure 9:
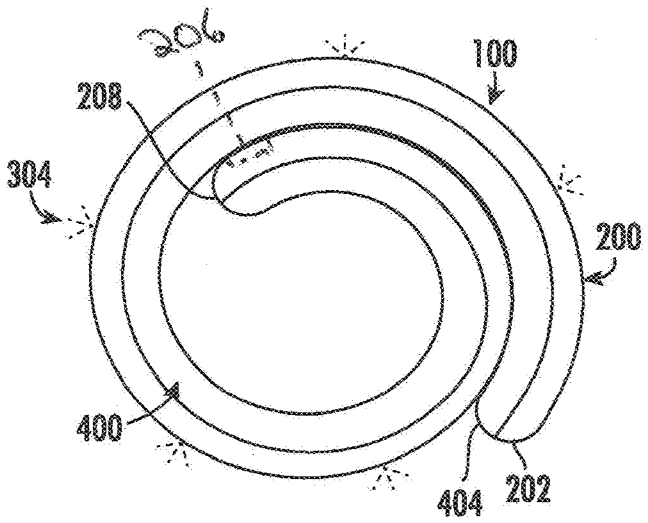
FIG. 9 is a perspective view of the present invention in the coiled configuration.
Figure 10:
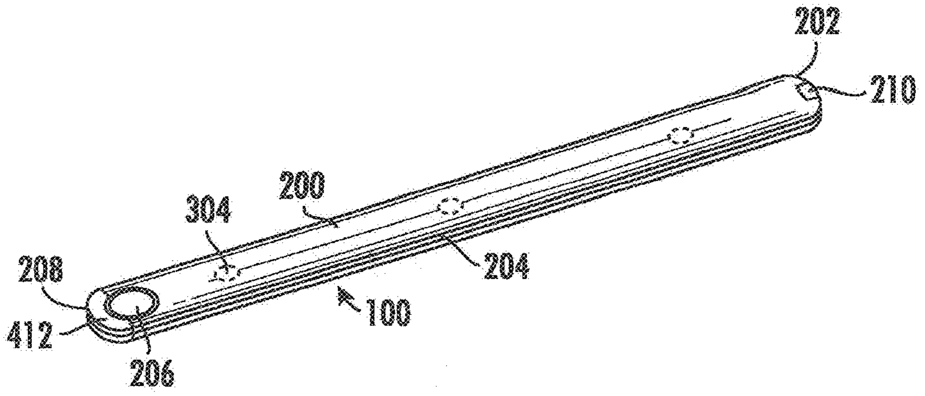
FIG. 10 is a perspective view of an alternate form of the wrist light.
Figure 17:
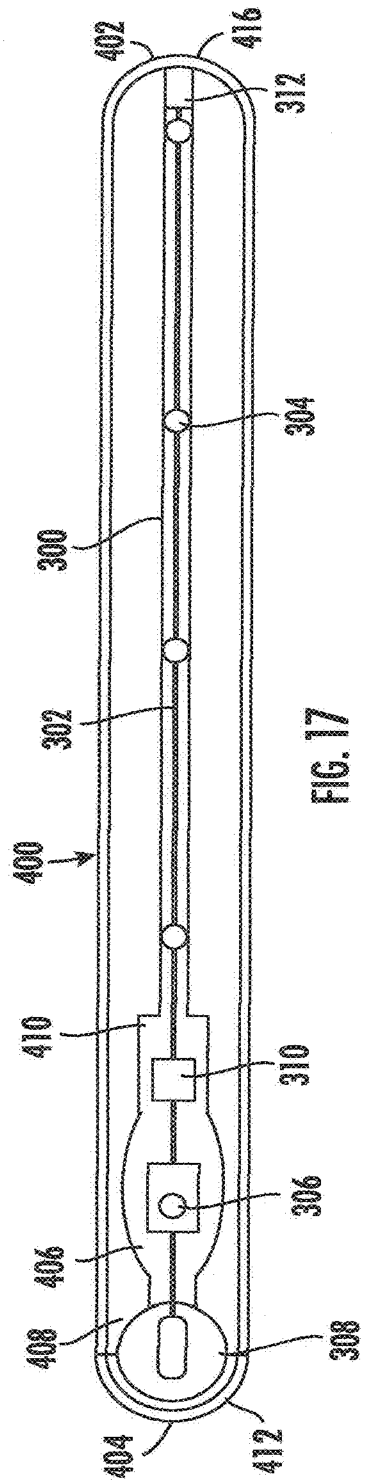
FIG. 17 is a top perspective view of an alternate form of the wrist light with the top element removed.
Figure 18:
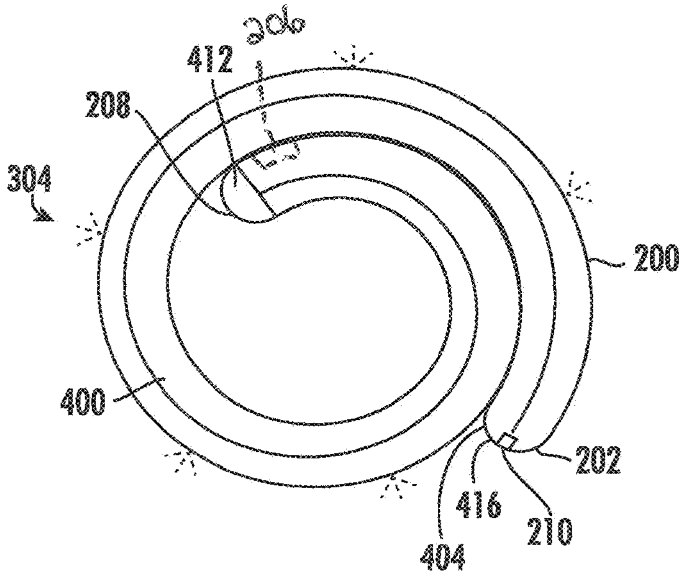
FIG. 18 is a perspective view of an alternate form of the wrist light in the coiled configuration.

FIGS. 9 and 18 show the wrist light 100 of the present invention in the coiled configuration. In this configuration, the bi-stable spring element 500 is in the coiled configuration. This configuration is useful for wrapping the wrist light 100 around the wrist of the user and does not require clasps, buckles or other connections to retain the wrist light 100 in the coiled configuration. When the wrist light 100 is in the coiled configuration, the top element 200 is stretched relative to the body element 400 because the radius of the coiled configuration causes the top element 200 to have a larger radius than the radius of the bottom element 400. In one configuration of the present invention, the switch element 306 and power source 308 may be connected in an alternate configuration such that the LEDs 304 are illuminated only in the coiled configuration because the increased distance along the top element 200 causes the wire shaped element 302 to move slightly relative to the switch element 306 and/or the power source 308 to cause the connection between the power source 308 and switch element 306 to be activated. This may be accomplished by having a small gap between the wire shaped element and the switch element 306 in the straight configuration or between the switch element and the power source 308 in the straight element. When the wrist light 100 is in the coiled configuration, this gap is closed, and the circuit is completed, and the LEDs 304 are powered. As shown in FIGS. 10 and 17, the wrist light may also include an end cap 412 having a USB connector to allow the wrist light to be rechargeable. The top element 200 is preferably shaped as an elongate and flexible member having a curved surface at the first end 202 and rectangular surface 204 and circular shaped surface 206 along the second end 208. The top element 200 is preferably formed of any suitable material that is both sufficiently strong but also adequately flexible, typically silicone, vinyl, or fabric. Additionally, the top element 200 may be fully transparent, semi-transparent or selectively transparent. As shown in FIGS. 1 and 8, the first end 202 of the top element 200 encloses the lighting element 300 and is either fully transparent or semi-transparent at least along the locations of the LEDs 302 of the lighting element 300. The first end 202 of the top element 200 preferably forms a tapered or curved surface in combination with the body element 400. The second end 208 of the top member 200 includes both the rectangular section 204 and circular shaped section 206. The rectangular section 204 is positioned over the switch element 306 to provide a flexible protective surface to allow the user to activate the switch element 306 by pressing on the rectangular section 204 of the top element 200. The circular section of the at the second end 208 is positioned over the battery or power source 308 to protect the power source 308 from exposure to the elements while still providing an access point for the replacement of the power source 308, if necessary.

As shown in FIGS. 10-18, the alternate form of the wrist light 100 includes a lighting element 300 having an elongate and generally rod shaped element 302 which is formed of a wire or similar material. In this embodiment, the rod shaped element 302 is flexible and preferably includes at least three LEDs 304 that are spaced apart along the length thereof and an end LED 312. The top element 200 of the embodiment also preferably includes an end slot 210 to allow the end LED to project therefrom. Each of these LEDs 304 provides an outwardly directed light source in the coiled configuration and a directional light with end LED 312. In this embodiment, the wrist light 100 is generally sized for use on a child's wrist and therefore, fewer LED lights are used. In an embodiment directed for use by adults, more lights may be spaced apart along the rod shaped element 302. The lighting element also includes a switch element 306 that may be formed from many available elements such as a depressible on/off switch. As shown, the battery or power source 308 is also aligned along the lighting element 300 and may be a standard battery such as a watch battery and as described above, a control element 310 may be used to allow the user to select lighting patterns and colors for the wrist light 100.

The body element 400 of this embodiment is an elongate and generally rectangular element and is sized to fixedly receive the top element 200 thereon or therein to form a smooth surface between the two elements. The body element 400 is preferably formed of a flexible and durable material that includes a plurality of recesses thereon and is formed of material that is either the same or similar to the material of the top element 200. The top surface of the body element 400 includes the first end 402 which is positioned adjacent to the first end 202 of the top element 200 when the wrist light 100 is assembled. The first ends 402 and 202 each include a recessed end slot, 210 and 416, respectively to allow the light from the end LED 312 to project therefrom. The rod shaped element 302 of the lighting element 300 is sandwiched between the top element 200 and body element 400. As described below, the rod shaped element 302 is movable in the recessed slot 414 relative to the top element 200 and body element 400. The body element 400 also includes a second end 404 having a first recessed area 406 and a second recessed area 408. The first recessed area 406 is sized to receive the switch element 306 therein in a relatively fixed position. The second recessed area 408 is sized to receive the power source or battery 308 therein. The body element may also include a third recessed area 410 that is sized to receive a control element to allow the user to select the lighting pattern or colors for the LEDs 304. The bottom surface of the body element 400 preferably includes the spring element 500 attached thereto. In this embodiment, a removable end cap 412 may be included to allow for the use of a USB or similar connector to allow the user to recharge the power source 308. The spring element 500 may be affixed to the bottom surface of the body element 500 or may be received in a recess thereon. Finally, the recessed slot 414 which extends along the lengthwise dimension of the body element 400 to movably receive rod element 302 and LEDs 304 of the lighting element 300 therein.

The spring element 500 of this embodiment is preferably a bi-stable type of spring such that the spring is stable in an elongate configuration as well as the coiled configuration. The spring element 500 is typically made of, but not limited to, a metal or plastic that is fashioned in such a way as to be stable in both the coiled and straight configurations. When the spring element 500 is stressed sufficiently while in its straight configuration, it changes shapes into a circular coil as shown in FIGS. 9 and 18. The elements of the wrist light 100 may be assembled using various adhesives or may be snap fit to provide the device shown in the Figures and operatively described herein. Additionally, although the LEDs are described as projecting through the top element 200, the LEDs may also be configured and positioned adjacent to include openings (not shown) in the top element 200 to allow the light from the LEDs to project therefrom.

I claim:

1. A wrist illuminating device comprising:
- an elongate member having top and bottom surfaces, first and second ends and a bistable spring;
- a plurality of light elements mounted within said elongate member adjacent to said top surface of said elongate member;
- a battery power supply for providing electrical power to said light elements;
- a switch for controlling said electrical power to said light elements;
- wherein said elongate member is movable between a generally flat configuration and a coiled configuration in response to movement of the bistable spring from a flat configuration to a coiled configuration and having an outer and inner surface in said coiled configuration wherein said lights elements are disposed along said outer surface of said elongate member formed during the coiled configuration of said elongate member and said switch is positioned adjacent to said inner surface in the coiled configuration of said elongate member; and
- said first end of said elongate member includes an end slot thereon and one of said light elements is aligned to project illumination from said first end of said elongate member.

2. The wrist illuminating device of claim 1, wherein said elongate member forms a housing constructed of a top element and a body element, wherein said top element is formed of a material to allow light from said light elements to be observed therethrough and wherein said top element is stretched relative to said body element as said elongate member is moved between the flat configuration and coiled configuration of said bistable spring.

3. The wrist illuminating device of claim 2, wherein said light elements are light emitting diodes (LEDs) and said light elements are observable through said top element in the flat and coiled configurations of said elongate member.

4. The wrist illuminating device of claim 2, wherein said elongate member includes said switch that consists of an internal switch for distributing power from said battery power supply to said light elements.

5. The wrist illuminating device of claim 2, wherein electrical wires are routed between said top element and said body element and said battery power supply is positioned adjacent to a second end of said body element.

6. The wrist illuminating device of claim 5, wherein said switch controls the illumination of the light elements and said wires are movable relative to said top element and said body element as said elongate member is moved between the flat and coiled configurations.

7. The wrist illuminating device of claim 1, wherein said elongate member is moved between a generally flat configuration and a coiled configuration in response to movement of the bistable spring from a flat configuration to a coiled configuration and wherein said outer surface of said elongate member is stretched relative to the inner surface of said elongate member as said elongate member is moved between the flat configuration and coiled configuration of said bistable spring.

8. The wrist illuminating device of claim 1, wherein the elongate member includes said second end having said battery power supply generally adjacent thereto and said first end includes said end slot thereon and said one of said light elements is oriented to project illumination through said end slot and from said first end.

9. A wrist illuminating device comprising:

an elongate member having top and bottom surfaces, first and second ends and a bistable spring;

a plurality of light elements mounted within the elongate member adjacent to said elongate member outer surface wherein said light elements having wires; a power source and a switch connected thereto;

the bistable spring being movable between a generally flat configuration and a coiled configuration; and wherein said light elements are positioned adjacent to said outer surface of said elongate member in the coiled configuration thereof to project illumination from said light elements through said outer surface of said elongate member in the coiled configuration of said elongate member and said first end of said elongate member includes an end slot thereon that is configured to allow one of said light elements to project illumination therefrom.

10. The wrist illuminating device of claim 9 wherein the elongate member is generally oblong and includes a top element and a body element having first ends and second ends with said light elements sandwiched between said body element and said top element and said top element is stretched relative to said body element as said bistable spring is moved from the flat configuration to the coiled configuration.

11. The wrist illuminating device of claim 9, wherein said light elements are light emitting diodes (LEDs) and said light elements are observable through said elongate member in the flat and coiled configurations of said elongate member and wherein said elongate member is movable between a generally flat configuration and a colled configuration in response to movement of the bistable spring and said elongate member having an outer and inner surface in said coiled configuration wherein said light elements are disposed along said outer surface of said elongate member formed during the coiled configuration of said elongate member and said switch is positioned adjacent to said inner surface in the coiled position of said elongate member.

12. The wrist illuminating device of claim 11, wherein said light elements are connected to said switch which consists of an internal switch connected thereto and said switch is depressible through said top surface of said elongate member for distributing power from said power source to said light elements.

13. The wrist illuminating device of claim 11, wherein said wires are routed between a top element and a body element and said power supply is positioned adjacent to a second end of the body element.

14. The wrist illuminating device of claim 13, wherein said power supply is rechargeable through a USB connector and said wires are movable relative to said top element as said elongate member is moved between the flat and coiled configuration.

15. A wrist illuminating device comprising:

an elongate member having top and bottom surfaces; first and second ends and a bistable spring;

said elongate member further including a top element, a body element and a plurality of light elements sandwiched therebetween;

said light elements are sandwiched within said elongate member adjacent to said elongate member top surface wherein said light elements include a plurality of lights connected to a wire; a power source and a switch;

said body element including a plurality of recesses and channels therein to receive said light elements, wire, power source and switch therein;

said bistable spring being movable between a generally flat configuration and a coiled configuration, wherein the movement of said bistable spring between the flat and coiled configurations causes said elongate member to assume flat and coiled configurations having an outer surface and an inner surface in the coiled configuration and said light elements are positioned adjacent to said outer surface of said elongate member in the coiled configuration thereof to project illumination from said outer surface of said elongate member in the coiled configuration of said elongate member and said switch is positioned adjacent to the inner surface in the coiled position of said elongate member; and further comprising a light element of said plurality of light elements aligned with said first end of said elongate member to project illumination through said first end of said elongate member.

16. The wrist illuminating device of claim 15 further comprising a separate light element from said plurality of light elements aligned with an end slot on said first end of said elongate member to project illumination from said end slot on said first end of said elongate member.

* * * * *